Sept. 27, 1949.　　　R. W. PHILABAUM　　　2,482,795
GROUND SPEED AND DRIFT INDICATOR
Filed May 27, 1946　　　　　　　　　　　　2 Sheets-Sheet 1
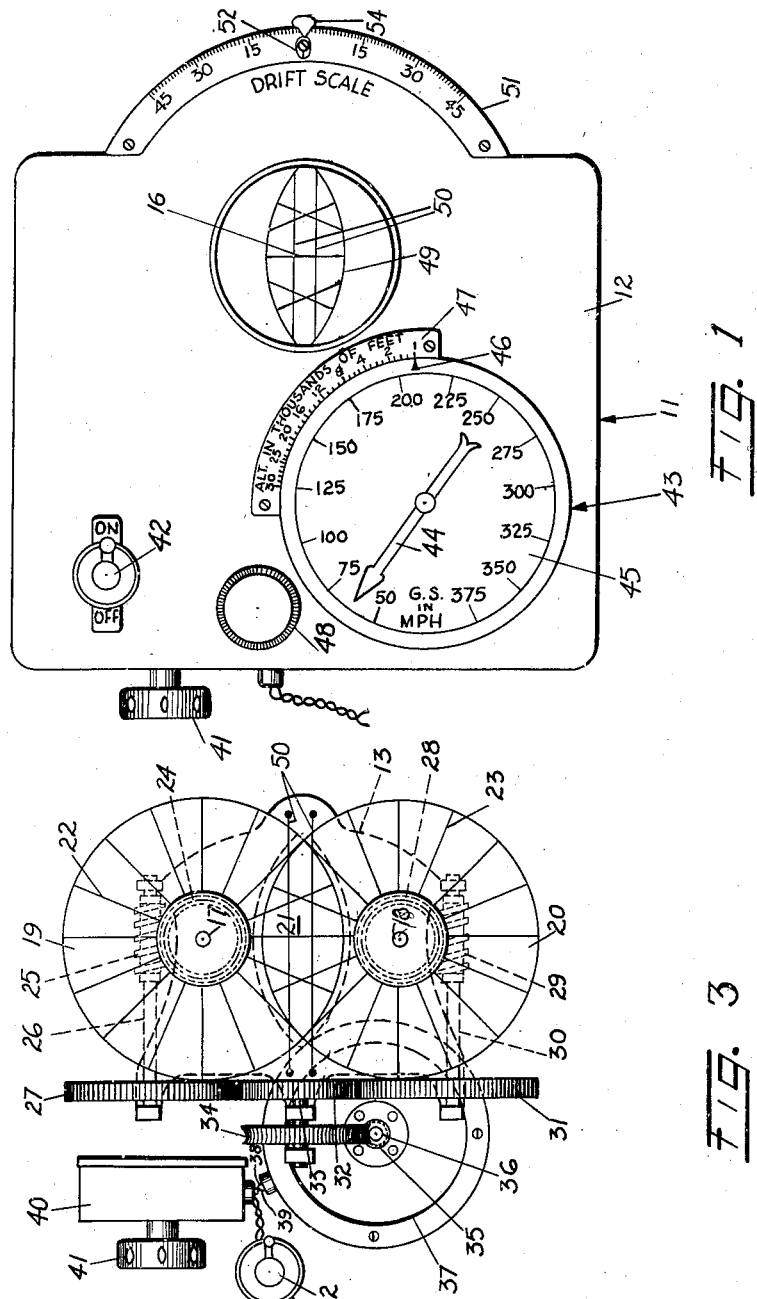
INVENTOR
ROBERT WAYNE PHILABAUM, DEC'D.
BY THELMA PHILABAUM, ADMINISTRATRIX
BY
ATTORNEY

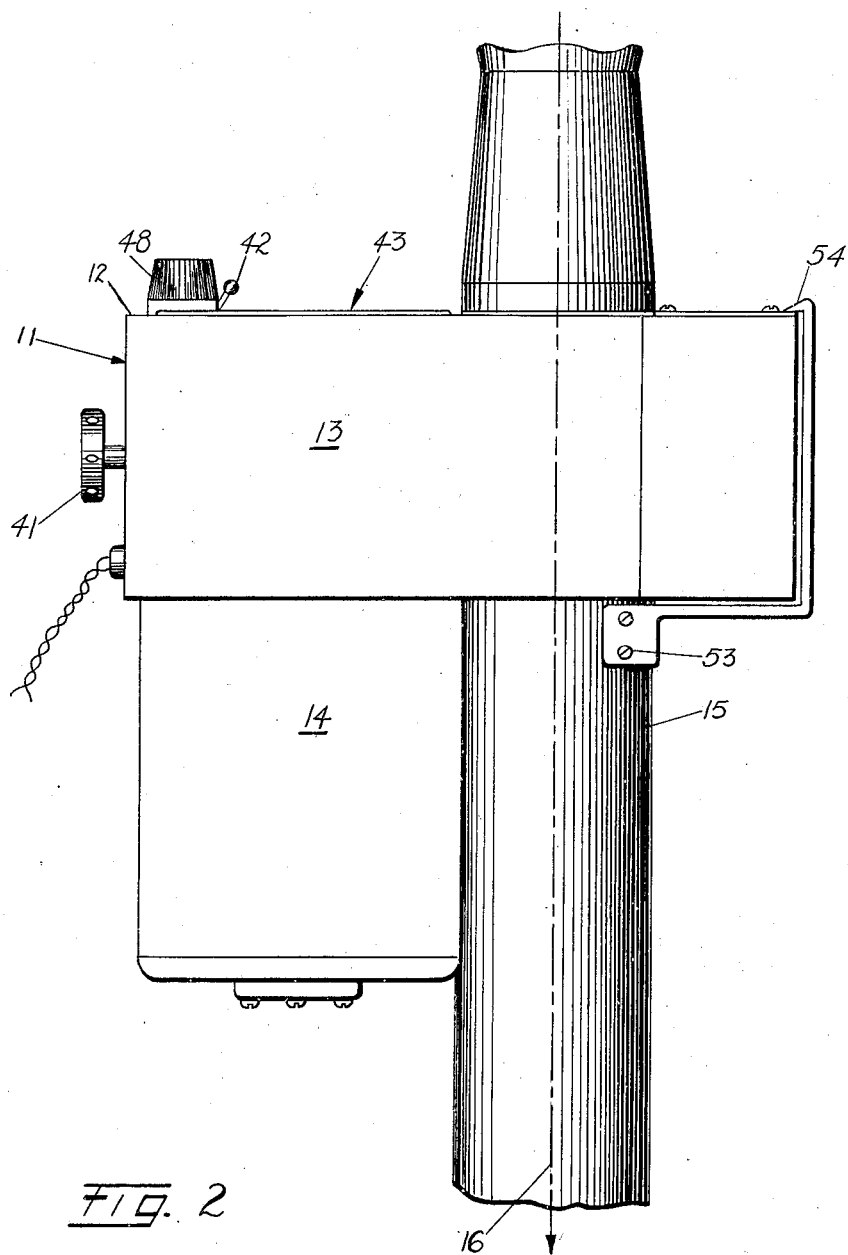

Patented Sept. 27, 1949

2,482,795

UNITED STATES PATENT OFFICE 2,482,795

GROUND SPEED AND DRIFT INDICATOR

Robert Wayne Philabaum, deceased, late of Elkhart County, Ind., by Thelma Philabaum, administratrix, Elkhart, Ind.

Application May 27, 1946, Serial No. 672,499

6 Claims. (Cl. 33—46.5)

(Granted under the act of March 3, 1883, as amended April 30, 1928; 370 O. G. 757)

The present invention concerns a combined ground speed and drift indicator for an aircraft.

An object of the invention is to provide an instrument having an optical element that can be aligned with apparent movement of the ground past an observer's line of vision to indicate the aircraft drift angle and having means providing a moving pattern that can be synchronized with the apparent speed of movement of ground past the observer's line of vision to afford an indication of the ground speed of the aircraft.

Further objects and advantages of this invention, as well as its construction, arrangement and operation, are apparent from the following description and claims in connection with the accompanying drawings, in which, Fig. 1 is a top plan view of a preferred embodiment of the invention.

Fig. 2 is a front elevational view of the embodiment shown in Fig. 1.

Fig. 3 is a top plan view of the internal mechanism.

There is shown an instrument case 11 having a top 12, sides 13 and a motor case 14 depending therefrom. Instrument case 11 is mounted for rotation upon an optical tube 15 having an optical axis 16 that establishes the line of vision of an observer.

Mounted within case 13 upon vertical spindles 17 and 18 are two transparent discs 19 and 20 disposed in overlapping relation as shown at 21. Discs 19 and 20 are provided with radial indices 22 and 23 disposed in equally spaced relation. Discs 19 and 20 are arranged for opposite rotation.

Mounted on spindle 17 is a gear 24 driven by a worm gear 25 mounted on a shaft 26 on the other end of which is mounted a spur gear 27. Mounted on spindle 18 is a gear 28 driven by a worm gear 29 mounted on a shaft 30 on the other end of which is mounted a spur gear 31. Spur gears 27 and 31 are driven by a pinion gear 32 mounted on a shaft 33 on the other end of which is mounted a gear 34 driven by worm gear 35 mounted on motor shaft 36 of a motor 37.

Motor 37 is connected by conductors 38 and 39 through a rheostat 40 having a control knob 41 and a switch 42 to a suitable source of current (not shown).

When switch 42 is turned on, motor 37 rotates and causes opposite rotation of discs 19 and 20 with the result that indices 22 and 23 form a moving pattern in the overlapping portion 21 of the discs and such pattern moves in the direction of rotation of the discs. The speed of movement of this pattern is controlled by manual operation of knob 41 of rheostat 40, which directly controls the speed of rotation of motor 37.

Mounted on top 12 of case 11 above motor 37 is a tachometer 43 having a pointer 44 that moves in correlation with the speed of rotation of motor 37. Tachometer 43 has a dial face 45 calibrated in terms of ground-speed units and at its periphery provided with an index 46. Mounted adjacent the periphery of dial face 45 is a scale 47 calibrated in terms of altitude units. Dial face 45 of tachometer 43 is mounted for rotation so that index 46 thereof can be brought into registration with the proper calibration of scale 47 to correspond with the altitude at which an observation is being made. An adjustment knob 48 is provided for adjusting the angular position of dial face 45.

In top 12 of case 11 above the overlapping portion 21 of discs 19 and 20 is an opening 49 through which an observer sighting along optical axis 16 can view the moving pattern established by rotation of discs 19 and 20. A pair of parallel reference lines 50 are provided on case 11 so that an observer looking through the instrument can turn case 11 upon tube 15 until reference lines 50 are in alignment with the apparent direction of movement of the ground.

Mounted on case 11 and concentric with the optical axis 16 of the instrument is a scale 51 calibrated in angular degrees about optical axis 16 and provided with a zero calibration 52 in alignment with a line drawn midway between reference lines 50. Mounted upon optical tube 15 by means of screws 53 is a pointer 54. Pointer 54 is disposed so that a line drawn through optical axis 16 and pointer 54 is parallel to the longitudinal axis of the aircraft. When an observer turns case 11 to bring reference lines 50 into alignment with the apparent direction of movement of the ground, pointer 54 registers with scale 51 so as to indicate the angle of drift of the aircraft.

Operation of the device is as follows. A drift reading is made with switch 42 in "off" position so that motor 37 is not turning and so that discs 19 and 20 are stationary under which condition case 11 is rotated about optical tube 15 until reference lines 50 are brought into alignment with the apparent direction of movement of the earth. The calibration at which pointer 54 registers with scale 51 indicates the angle of drift of the aircraft.

After the drift observation is made, the ground speed of the aircraft is determined with the case 11 in adjusted position. Adjustment knob 48 is turned to bring index mark 46 of tachometer dial face 45 into registration with the proper calibration on scale 47 corresponding with the altitude at which the determination is to be made. Conductors 38 and 39 are connected to a suitable source of current (not shown) and switch 42 is thrown to the "on" position to start rotation of motor 37. This in turn causes opposite rotation of discs 19 and 20 with the result that the pattern formed by the over-lapping portion 21 of discs 19 and 20 starts to move across the observer's line of vision. Rheostat knob 41 is adjusted until the speed of the moving pattern is synchronized with the apparent speed of the movement of the earth past the observer's line of vision. The calibration on dial 45 which is in registration with pointer 44 of tachometer 43 gives a reading of the ground speed of the aircraft.

It is to be understood that various modifications and changes can be made in this invention without departing from the spirit and scope thereof as set forth in the appended claims.

The invention described herein may be manufactured and used by or for the Government of the United States of America for governmental purposes without the payment of any royalties thereon or therefor.

What is claimed is:

1. A ground-speed indicator comprising a pair of oppositely rotatable discs, said discs having over-lapping transparent portions, indices on said discs to form a moving pattern adapted to pass the line of vision of an observer looking toward the ground, means for synchronously rotating said discs, means for controlling the rotational speed of said discs to synchronize movement of the pattern with apparent movement of the ground past the observer's line of vision, and means responsive to rotational speed of said discs for indicating ground speed.

2. A ground-speed indicator comprising a pair of transparent discs mounted for opposite synchronized rotation, said discs being mounted with portions thereof over-lapping, said discs having a plurality of equally-spaced radial indices thereon, said indices upon rotation of said discs forming a moving pattern adapted to pass the line of vision of an observer looking toward the ground, an electric motor, a gear train interconnecting said motor and said discs whereby rotation of said motor will cause opposite synchronized rotation of said discs, a rheostat connected with said motor whereby adjustment of the rheostat controls the motor speed and speed of rotation of said discs so that said moving pattern can be synchronized with apparent movement of the ground past the observer's line of vision, a tachometer connected with said motor and having a pointer responsive to rotational speed of said motor, said tachometer having a dial face calibrated in units of ground speed and having an index on the periphery thereof, a fixed scale located at the periphery of said dial face and calibrated in units of altitude, said dial face being mounted for rotation so that said index can be brought into registration with said fixed scale.

3. A ground-speed indicator comprising a pair of transparent discs mounted for opposite synchronized rotation, said discs being mounted with portions thereof overlapping, said discs having a plurality of equally-spaced radial indices thereon, said indices upon rotation of said discs forming a moving pattern adapted to pass the line of vision of an observer looking toward the ground, a motor, means connecting said motor and discs whereby operation of said motor causes opposite synchronized rotation of said discs, means for controlling the rotational speed of said discs so that the moving pattern can be synchronized with apparent movement of the ground past the observer's line of vision, a tachometer responsive to rotational speed of said discs, said tachometer having a dial face with calibrations and having an index on the periphery thereof, a fixed scale located at the periphery of said dial face, said dial face being mounted for rotation so that said index can be brought into registration with said fixed scale.

4. A ground-speed indicator comprising a pair of transparent discs mounted for opposite synchronized rotation, said discs being mounted with portions thereof overlapping, said discs having a plurality of equally-spaced radial indices thereon, said indices upon rotation of said discs forming a moving pattern adapted to pass the line of vision of an observer looking toward the ground, a motor, means connecting said motor and discs whereby operation of said motor causes opposite synchronized rotation of said discs, means for controlling the rotational speed of said discs so that the moving pattern can be synchronized with apparent movement of the ground past the observer's line of vision, a tachometer responsive to rotational speed of said discs, and means for compensating said tachometer in correlation with the altitude at which an observation is made.

5. An indicating instrument comprising a support member, a casing member mounted for rotation about an axis on said support member, said axis establishing a line of vision of an observer, indicating means associated with said members for indicating the angular position of rotation of said casing member relative to said support member to indicate drift angle, a pair of oppositely rotating discs on said casing member, said discs having overlapping transparent portions, indices on said discs to form a moving pattern adapted to pass the observer's line of vision, means for synchronously rotating said discs, means for controlling the rotational speed of said means to synchronize movement of the pattern with apparent movement of the ground past the observer's line of vision, and means responsive to rotational speed of said discs for indicating ground speed.

6. An indicating instrument comprising a pair of transparent discs mounted for opposite synchronized rotation, said discs being mounted with portions thereof overlapping, said discs having a plurality of equally-spaced radial indices thereon, said indices upon rotation of said discs forming a moving pattern adapted to pass the line of vision of an observer looking toward the ground, a motor, means connecting said motor and discs whereby operation of said motor causes opposite synchronized rotation of said discs, means for controlling the rotational speed of said discs so that the moving pattern can be synchronized with apparent movement of the ground past the observer's line of vision, a tachometer responsive to rotational speed of said discs, said tachometer having calibrations and an index for registration with said calibrations, means for compensating said tachometer in correlation with the altitude at which an observation is made, and means for indicating the angle of drift relative to the ground.

THELMA PHILABAUM,
*Administratrix of the Estate of Robert Wayne Philabaum, Deceased.*

REFERENCES CITED

The following references are of record in the file of this patent:

UNITED STATES PATENTS

| Number | Name | Date |
| --- | --- | --- |
| 1,919,126 | Perkins | July 18, 1933 |
| 2,413,683 | Caldwell | Jan. 7, 1947 |